United States Patent
Armeni et al.

(10) Patent No.: US 10,277,859 B2
(45) Date of Patent: Apr. 30, 2019

(54) DEVICES, SYSTEMS, AND METHODS FOR GENERATING MULTI-MODAL IMAGES OF A SYNTHETIC SCENE

(71) Applicant: CANON KABUSHIKI KAISHA, Tokyo (JP)

(72) Inventors: Iro Armeni, Woodside, CA (US); Sandra Skaff, Mountain View, CA (US); Jie Yu, Santa Clara, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 15/494,352

(22) Filed: Apr. 21, 2017

(65) Prior Publication Data
US 2018/0077376 A1 Mar. 15, 2018

Related U.S. Application Data

(60) Provisional application No. 62/394,600, filed on Sep. 14, 2016, provisional application No. 62/441,899, filed on Jan. 3, 2017.

(51) Int. Cl.
*H04N 5/445* (2011.01)
*G06T 7/70* (2017.01)
*H04N 21/845* (2011.01)

(52) U.S. Cl.
CPC ........... *H04N 5/44504* (2013.01); *G06T 7/70* (2017.01); *H04N 21/845* (2013.01); *G06T 2207/10024* (2013.01); *G06T 2207/10028* (2013.01)

(58) Field of Classification Search
CPC .... H04N 5/44504; H04N 21/845; G06T 7/70; G06T 2207/10028; G06T 2207/10024

USPC .......................................................... 382/284
See application file for complete search history.

(56) References Cited

U.S. PATENT DOCUMENTS

| 2015/0243035 A1* | 8/2015 | Narasimha .............. G06T 19/20 382/154 |
| 2017/0243338 A1* | 8/2017 | Li ........................... G06T 5/002 |

FOREIGN PATENT DOCUMENTS

EP          2811424 A2 * 12/2014     ........... G06K 9/6259

OTHER PUBLICATIONS

Baochen Sun et al., From Virtual to Reality: Fast Adaptation of Virtual Object Detectors to Real Domains, BMVC 2014, Sep. 2014.
Angel X. Chang et al., ShapeNet: An Information-Rich 3D Model Repository, Dec. 9, 2015.
Matthew Fisher et al., Example-based Synthesis of 3D Object Arrangements, Nov. 2012.
Michael Gschwandtner et al., BlenSor: Blender Sensor Simulation Toolbox, ISVC 2011, Sep. 2011.

(Continued)

*Primary Examiner* — Amandeep Saini
(74) *Attorney, Agent, or Firm* — Canon U.S.A., Inc. IP Division

(57) ABSTRACT

Devices, systems, and methods obtain an object model, add the object model to a synthetic scene, add a texture to the object model, add a background plane to the synthetic scene, add a support plane to the synthetic scene, add a background image to one or both of the background plane and the support plane, and generate a pair of images based on the synthetic scene, wherein a first image in the pair of images is a depth image of the synthetic scene, and wherein a second image in the pair of images is a color image of the synthetic scene.

20 Claims, 13 Drawing Sheets

(56) References Cited

OTHER PUBLICATIONS

Saurabh Gupta et al., Cross Modal Distillation for Supervision Transfer, submitted Nov. 15, 2015, presented at CVPR 2016, Jun.-Jul. 2016.
Ankur Handa et al., SceneNet: an Annotated Model Generator for Indoor Scene Understanding, May 2016.
Ankur Handa et al., SceneNet: Understanding Real World Indoor Scenes With Synthetic Data, submitted Nov. 26, 2015, presented at CVPR 2016, Jun.-Jul. 2016.
Xingchao Peng et al., Combining Texture and Shape Cues for Object Detection with Minimal Supervision, submitted Sep. 14, 2016, presented at ACCV '16, Nov. 2016.
Xingchao Peng et al., Learning Deep Object Detectors from 3D Models, Dec. 2015.
Nathan Silberman et al., Indoor Segmentation and Support Inference from RGBD Images, ECCV 2012, Oct. 2012.

* cited by examiner

DEVICES, SYSTEMS, AND METHODS FOR GENERATING MULTI-MODAL IMAGES OF A SYNTHETIC SCENE

CROSS-REFERENCE TO RELATED APPLICATIONS

This application claims the benefit of U.S. Provisional Application No. 62/394,600, which was filed on Sep. 14, 2016, and the benefit of U.S. Provisional Application No. 62/441,899, which was filed on Jan. 3, 2017.

BACKGROUND

Technical Field

This application generally relates to object detection in computer-vision.

Background

Deep learning technologies have demonstrated good performance in detecting objects in RGB-Depth images. However, these technologies require a great amount of training data.

SUMMARY

Some embodiments of a system comprise one or more computer-readable media and one or more processors that are coupled to the one or more computer-readable media. The one or more processors are configured to cause the system to obtain an object model, add the object model to a synthetic scene, add a texture to the object model, add a background plane to the synthetic scene, add a support plane to the synthetic scene, add a background image to one or both of the background plane and the support plane, and generate a pair of images based on the synthetic scene, wherein a first image in the pair of images is a depth image of the synthetic scene, and wherein a second image in the pair of images is a color image of the synthetic scene.

Some embodiments of one or more computer-readable storage media store computer-executable instructions that, when executed by one or more computing devices, cause the one or more computing devices to perform operations that comprise adding an object model to a synthetic scene, adding a texture to the object model, adding a background plane to the synthetic scene, adding a background image to the background plane, and generating a pair of images based on the synthetic scene, wherein a first image in the pair of images is a depth image of the synthetic scene, and wherein a second image in the pair of images is an illumination-map image of the synthetic scene.

Some embodiments of a method comprise selecting an object model from a first object category; adding the object model to a synthetic scene; selecting a texture from a first texture category, wherein the first texture category corresponds to the first object category; adding the texture to the object model; adding a background plane to the synthetic scene; selecting a background image from a first background-image category, wherein the first background-image category corresponds to the first object category; adding the background image to the background plane; and generating a pair of images based on the synthetic scene, wherein a first image in the pair of images is a depth image of the synthetic scene, and a second image in the pair of images is an illumination-map image of the synthetic scene.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
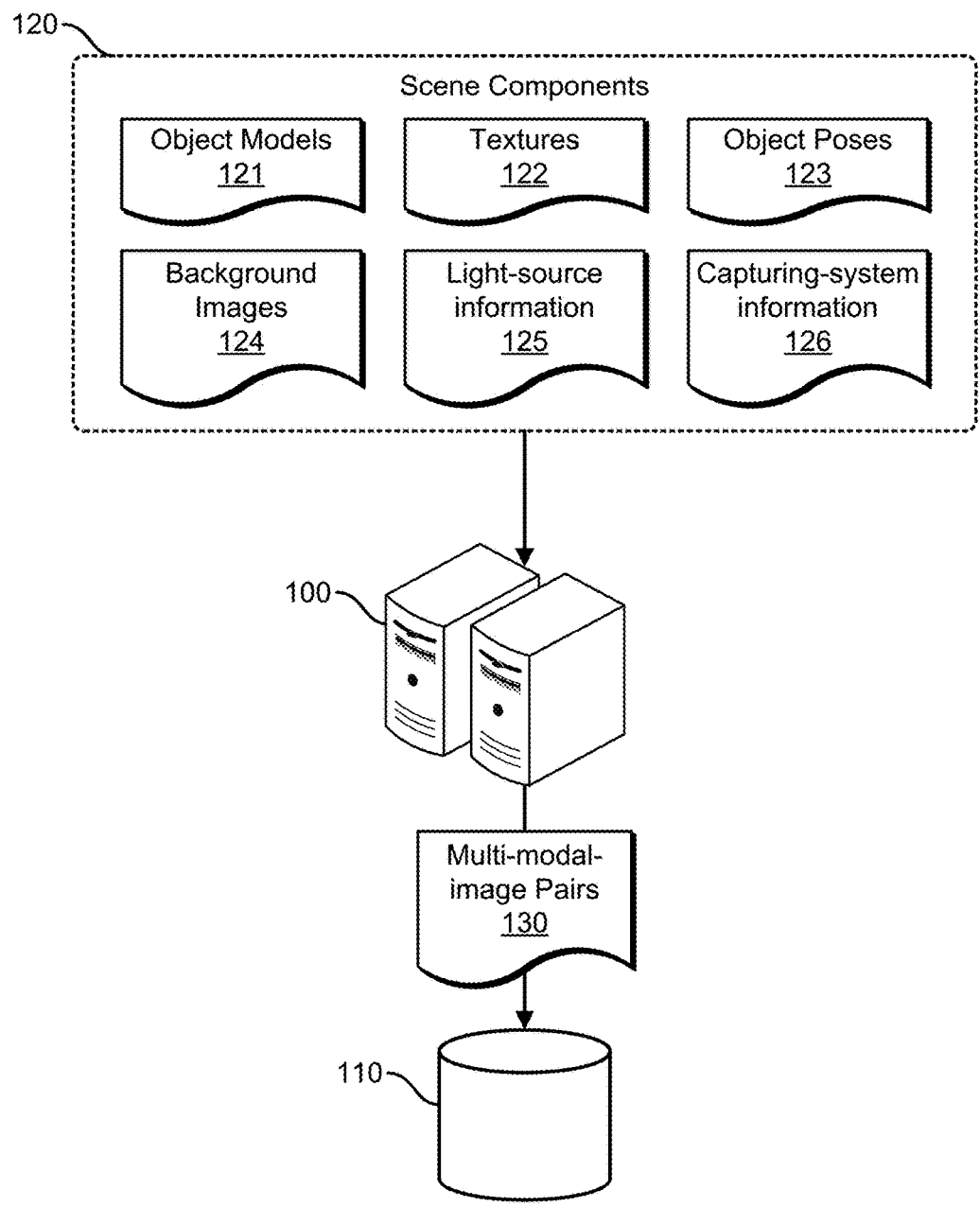
FIG. 1 illustrates an example embodiment of a system for generating synthetic images.
Figure 3A:
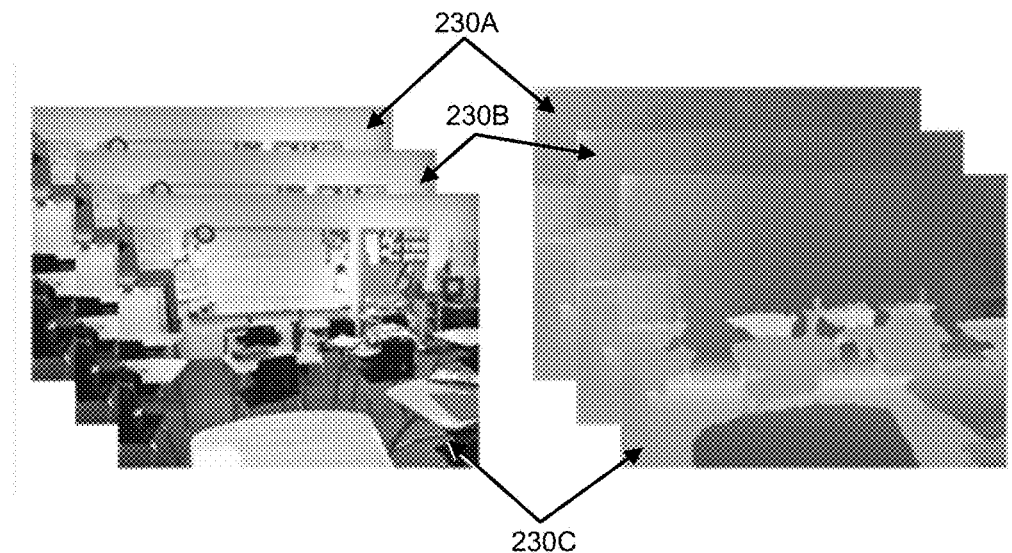
FIG. 3A illustrates example embodiments of multi-modal-image pairs.

FIG. 1 illustrates an example embodiment of a system for generating synthetic images. The system includes one or more synthetic-image-generation devices 100 and one or more storage devices 110. The one or more synthetic-image-generation devices 100 obtain scene components 120 and then generate synthetic multi-modal-image pairs 130 based on the scene components 120. The scene components 120 include one or more of the following: object models 121 (e.g., three-dimensional models, such as CAD models, point clouds, polygonal models, curve models), textures 122, object poses 123, background images 124, light-source information 125, and capturing-system information 126 (e.g., the intrinsic parameters of an imaging sensor, the extrinsic parameters of an image-capturing device). And a multi-modal-image pair 130 is a pair of images that includes an illumination-map image (e.g., an RGB image, a YCbCr image, a HSV image, a color image, a black-and-white image, a grayscale image) and a depth image. FIG. 3A illustrates example embodiments of multi-modal-image pairs. Three multi-modal-image pairs 230A-C are shown in FIG. 3A.

In the example embodiment of FIG. 1, the system stores the multi-modal-image pairs 130 in the one or more storage devices 110. In some embodiments, the one or more synthetic-image-generation devices 100 store the multi-modal-image pairs 130.

Figure 2:
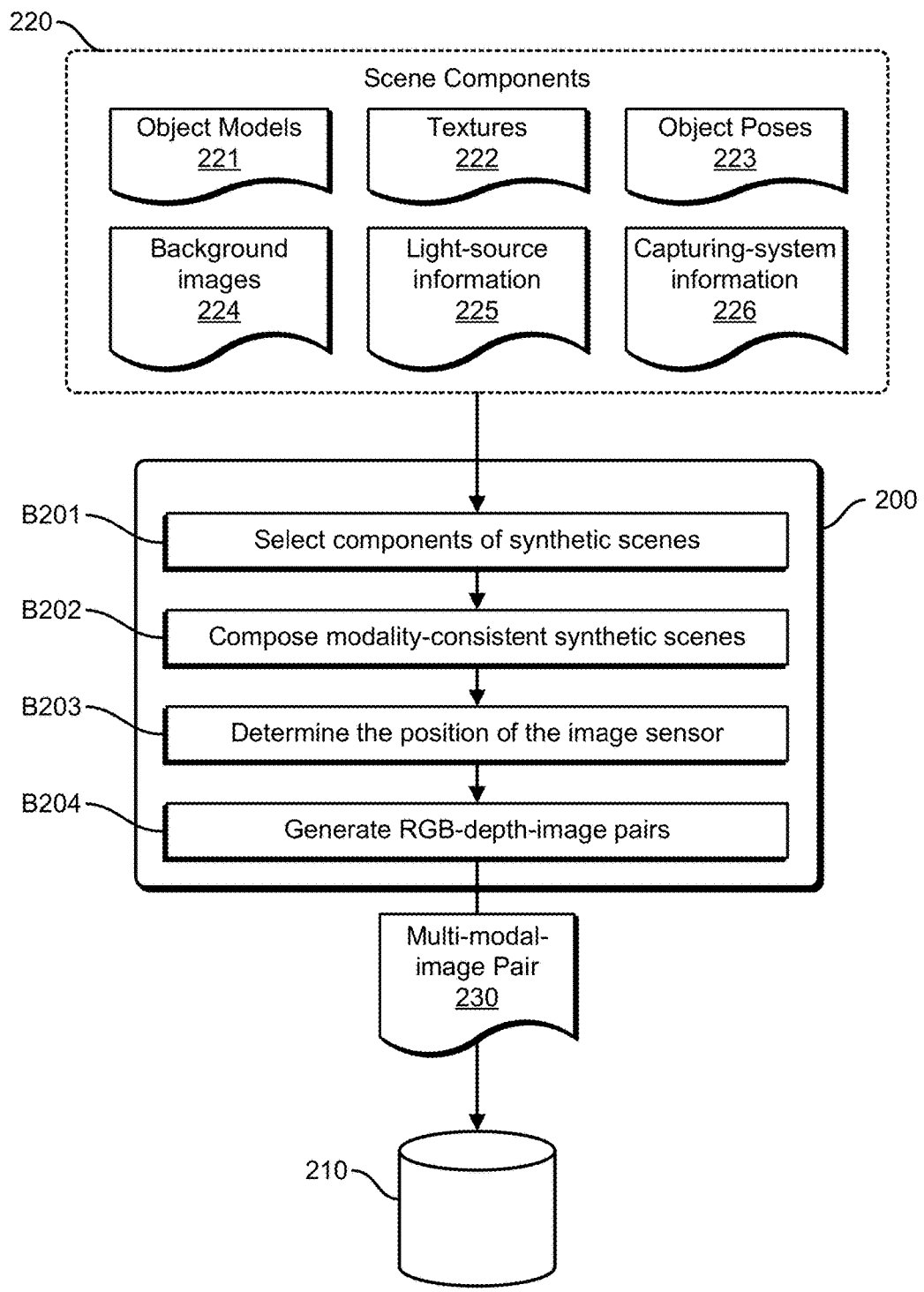
FIG. 2 illustrates an example embodiment of the flow of information in a system for generating synthetic images and the operations that are performed by a synthetic-image-generation device.

FIG. 2 illustrates an example embodiment of the flow of information in a system for generating synthetic images and the operations that are performed by a synthetic-image-generation device. The system includes the synthetic-image-generation device 200 and a storage device 210.

Figure 3B:
FIG. 3B illustrates example embodiments of object models for the 'chair' and 'table' object categories.
Figure 4A:
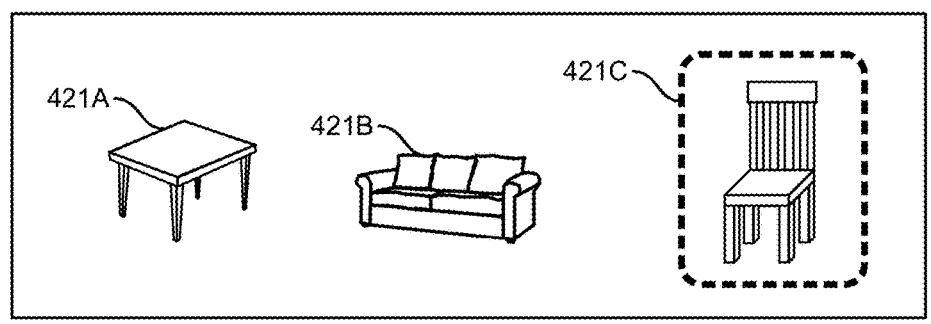
FIG. 4A illustrates example embodiments of object models.

In block B201, the synthetic-image-generation device 200 obtains one or more scene components 220 (e.g., from cameras, from other computing devices, from storage, from a library-storage device) and selects scene components 220 for a synthetic scene. This includes selecting one or more object models 221 (e.g., a CAD model), such as an object model 221 that belong to one or more object categories for which synthetic images are desired. FIG. 3B illustrates example embodiments of object models 221 for the 'chair' and 'table' object categories. Also, FIG. 4A illustrates example embodiments of object models 421A-C in a 'furniture' category, of which object model 421C is a selected object model.

The selection of an object model 221 may depends on an objective, and in some embodiments the scene components 220 include many object models 221 per object category. For some objectives, a larger object-model library and greater intra-category variation is more advantageous. Therefore, while performing multiple iterations of block B201, the synthetic-image-generation device 200 may select many different object models 221 from an object category.

Block B201 also includes selecting the three-dimensional (3D) pose of the object model 223 (object pose 223) in the synthetic scene. The object pose 223 may be described relative to the simulated image sensor or may be described relative to some other point of reference. In some embodiments, while generating synthetic images any possible three-dimensional object pose 223 can potentially be selected for the object model 221. Some embodiments of the synthetic-image-generation device 200 rotate the object model 221 to different poses 223 in successive images while keeping a simulated image sensor's rotation fixed. Rotating the object model 221 instead of the image sensor may not require recalculation of the simulated image sensor's extrinsic parameters every time that an object pose 223 is assigned to the object model 221. Other embodiments use different techniques to rotate the object model 221 relative to the simulated image sensor, such as rotating the simulated image sensor around the object model 221. Also, in some embodiments the three-dimensional object pose 223 must comply with depth-image requirements.

Figure 4B:
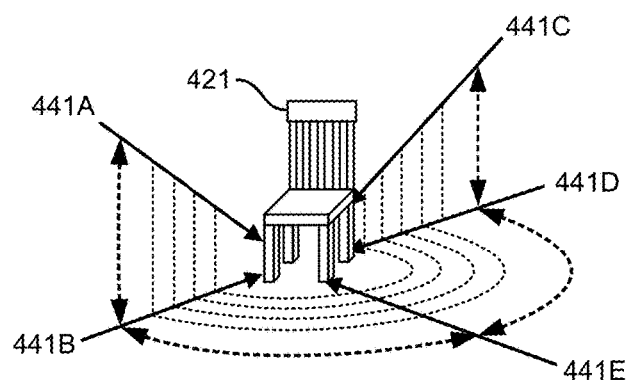
FIG. 4B illustrates an example embodiment of an object model and viewpoints of the object model.

FIG. 4B illustrates an example embodiment of an object model and viewpoints that observe the object model in different poses. In this example, the object model 421 is a model of a chair. Also, five viewpoints 441A-E from which the object model 421 can be observed are labeled, although this object model 421 and other object models can be viewed from many more viewpoints. From the perspective of each viewpoint 441A-E, the object model 421 is in a different pose. Thus, to change the pose of the object model 421 that is observed by a viewer (e.g., a simulated image sensor), the viewer may be moved to a different viewpoint (e.g., one of viewpoints 441A-E) or the object model 421 may be moved (e.g., rotated on one or more axis, translated on one or more axis).

Referring again to FIG. 2, in addition to the one or more object models 221 and their respective poses 223, other selected scene components 220 may include textures 222 (e.g., texture images); background images 224; a simulated light source, which is described by the light-source information 225; a type of the simulated image sensor, which is described by the capturing-system information 226; and intrinsic and extrinsic parameters of the simulated image sensor, which are also described by the capturing-system information 226.

Next, in block B202, the synthetic-image-generation device 200 composes one or more modality-consistent synthetic scenes. When composing a modality-consistent synthetic scene, the synthetic-image-generation device 200 may account for three issues: First, the synthetic-image-generation device 200 may account for the scale of the scene. In a depth image, the size of the object matters: An object model 221 of an arbitrary scale or in a different unit system than the rest of the synthetic scene may produce a synthetic multi-modal-image pair that does not comply with real-world object dimensions and thus real-world depth images. Second, the synthetic-image-generation device 200 may account for the synthetic scene's context. To generate an appropriate context for a synthetic scene in an image that has only color information (e.g., RGB data), the object model is placed in front of a background image 224, for example a background image 224 that depicts a random scene. Third, the synthetic-image-generation device 200 may account for the range of the simulated image sensor. When generating a color image, the distance from the image sensor to the object is generally not important as long as the image sensor's position is such that the object's projection on the image plane fits inside the frame. In a depth image, this distance may be important because the ability of image sensors to collect depth information is often limited by a maximum range within which they can accurately collect depth information, and any objects or parts of objects that fall outside this range will not be accurately depicted in the depth image. Accordingly, the synthetic-image-generation device 200 may account for the scale, for the synthetic scene's context, and for the range of the simulated image sensor.

To account for the scale, the synthetic-image-generation device 200 adjusts the dimensions of the selected object models 221 to match the scene's scale. For example, the synthetic-image-generation device 200 may first define a range of dimensions for each object category in the synthetic scene's unit system (e.g., meters, feet, etc.), such as a range of widths (e.g., because of isotropic scaling): range=[minW, maxW]. Also, other dimensions can be used instead of or in addition to width. The synthetic-image-generation device 200 uses this range of dimensions to determine whether the object model 221 complies with the scene's scale. If the object model's width lies outside of the range, then the object model's dimensions are adjusted.

Although the following description uses the metric system, a similar or identical approach can be followed for the imperial system or other units of measure. For example, if the object model's width is outside of the range of acceptable values, then the synthetic-image-generation device 200 may begin by assuming that the object model 221 was designed in centimeters or millimeters. The synthetic-image-generation device 200 may assign a factor of 0.01 for centimeters if maxW<width<1000, and 0.001 for millimeters if width>1000. The synthetic-image-generation device 200 may then multiply the width by this factor, and if the adjusted width lies inside the range, then the synthetic-image-generation device 200 scales the object model 221 by the factor. If not, then the synthetic-image-generation device 200 may randomly assign a value to the width such that the width satisfies the range constraint. Checking for a different unit of measure instead of immediately assigning a random value may produce more realistic dimensions for the object model 221.

Also for example, to scale the dimensions of an object mode 221, some embodiments of the synthetic-image-generation device 200 perform operations that can be described by the following pseudo code:

```
minW = defined minimum width for the object category;
maxW= defined maximum width for the object category;
width = object model's width in the synthetic 3D scene;
range = [minW, maxW];
if maxW < width < 1000
    then factor = 0.01
else if width > 1000
    then factor = 0.001
else
    then factor = 0.0;
if width *factor < minW or width *factor > maxW
    new width = 0.0
    while new width > maxW or new width < minW
        new width = random value
    factor = new width/width;
object dimensions = object dimensions * factor.
```

Figure 5A:
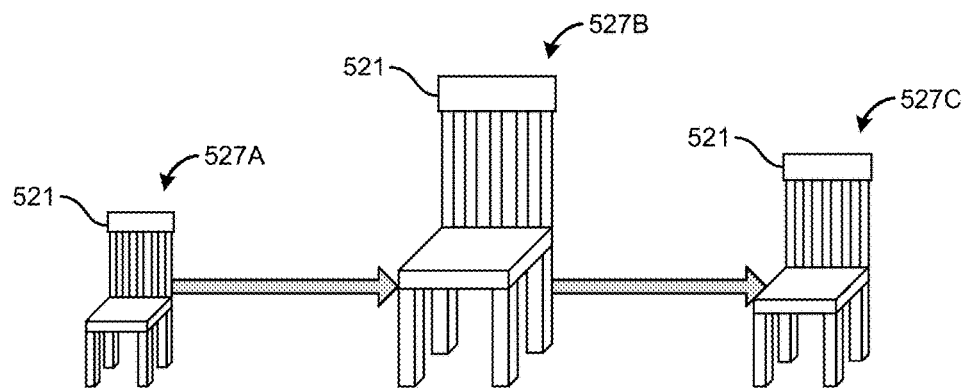
FIG. 5A illustrates different dimensions of an example embodiment of an object model.

FIG. 5A illustrates different dimensions of an example embodiment of an object model. Starting with the initial scale 527A of the object model 521, the scale of the object model 521 is increased to the second scale 527B. The scale of the object model 521 is then decreased to the third scale 527C, which is smaller than the second scale 527B but larger than the initial scale 527A in this example.

Figure 5B:
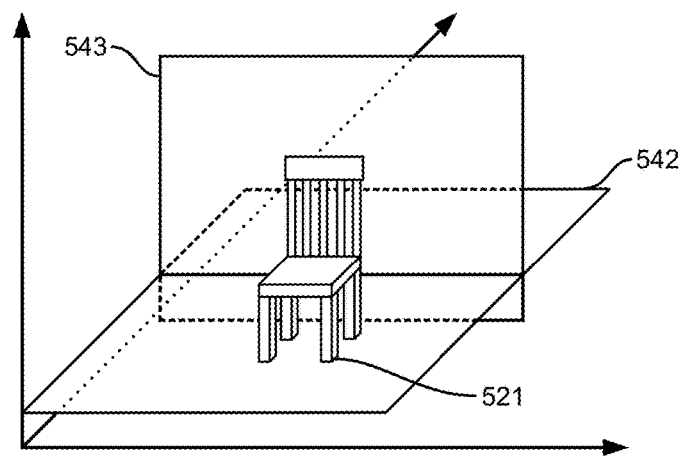
FIG. 5B illustrates example embodiments of a support plane and a background plane.

To account for the synthetic scene's context, the synthetic-image-generation device 200 adds two planes to the synthetic scene: a support plane and a background plane. The support plane may be a two- or three-dimensional object, and the background plane may be another two- or three-dimensional object. FIG. 5B illustrates example embodiments of a support plane 542 and a background plane 543, as well as an object model 521.

The support plane 542 may be a plane that is positioned underneath the object model 521, and the support plane 542 may be perpendicular to the object model's gravitational axis. Examples of real-world equivalents of the support plane 542 include a floor, a table, and a ceiling. The support plane 542 may be located under the object model 521 and have the same pose or approximately the same pose as the object model 521. Additionally, if the object model 521 is not compatible with a support plane 542 that is underneath the object model 521, but instead requires a support plane 542 that hangs over the object model 521, then the support plane 542 may be positioned accordingly.

In some embodiments, the support plane's scale is not important as long as the support plane's projection is larger than the image sensor's frame. Also, in some embodiments the support plane 542 is positioned so that it does not obstruct the view from the image sensor to the object model 521. For example, if the image sensor observes the bottom part of the object model 521, then adding the support plane 542 under the object model 521 may obstruct the direct view from the image sensor to the object model 521. Accordingly, the support plane 542 may be positioned over the object model 521.

The background plane 543 may be a plane that is perpendicular to or approximately perpendicular to the support plane 542, may be parallel to the gravitational vector, or may be located behind the object model 521 from the viewpoint of the image sensor. Examples of real-world equivalents of the background plane 543 include furniture (e.g., a bookcase or a coat rack) or building elements (e.g., a wall or a door) that exist behind an object. Additionally, if the support plane 542 is a 'hanging' plane, then the background plane 543 can be positioned accordingly.

The background plane's rotation may be varied to account for different scene layouts (e.g., parallel to the camera plane, equal to the rotation of the object model 521 around the x and y axes). And the size of the background plane 543 and the rotation of the background plane 543 may be set such that the projection of the background plane 543 on the image plane is at least as large as the image frame.

Additionally, in some embodiments the background plane 543 does not obstruct the view of the object model 521 or parts of it from the viewpoint of the image sensor, and the background plane 543 does not create unrealistic scenarios (e.g., by cutting the object model 521 in half). The effective depth range of the image sensor that will generate the depth images may also be accounted for when positioning the background plane 543: In some embodiments, the distance from the background plane 543 to the image sensor is within this range. Also, to include a larger part of the background plane 543 in the generated depth image, in some circumstances the background plane 543 should not be located at a distance that is equal to the image sensor's maximum range.

Additionally, the synthetic-image-generation device 200 may deform or distort the geometry of the background plane 543 or the support plane 542 and add noise to them, for example as shown in FIGS. 6A-D.

Figure 6A:
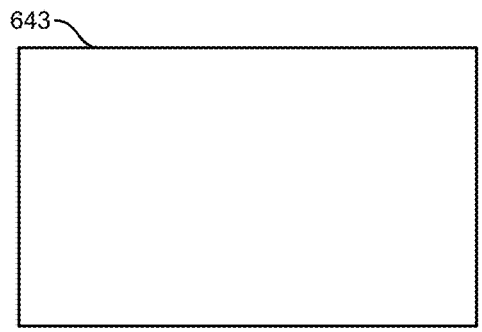
FIG. 6A illustrates an example embodiment of an initial background plane that includes four vertices.
Figure 6B:
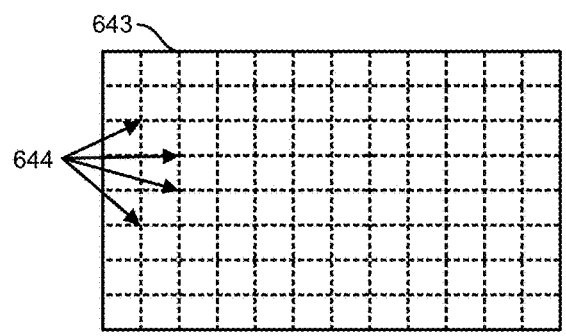
FIG. 6B illustrates an example embodiment of a background plane that has been subdivided.
Figure 6C:
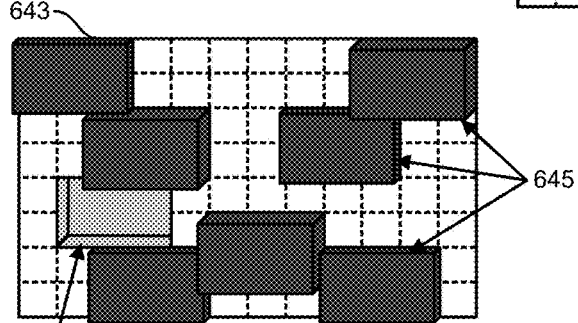
FIG. 6C illustrates a perspective view of an example embodiment of a distorted background plane.

FIG. 6A illustrates an example embodiment of an initial background plane 643 that includes four vertices. In this example, the synthetic-image-generation device 200 subdivides the initial background plane 643 in FIG. 6A into smaller regions and creates a grid or lattice of vertices 644, as shown in FIG. 6B. The synthetic-image-generation device 200 manipulates the positions of the vertices 644, thereby distorting the initial planar geometry of the background plane 643, for example as shown in FIG. 6C, which illustrates a perspective view of an example embodiment of a distorted background plane 643. To generate the distorted background plane 643, the synthetic-image-generation device 200 may select a region of the background plane 643 and move its vertices toward or away from the image sensor, thereby producing a planar surface with one or more extrusions 645 or intrusions 649. The extrusions 645 or intrusions 649 may mimic background objects. Some embodiments of the synthetic-image-generation device 200 select a region with a probability of 50% and move its vertices 644 toward or away from the image sensor. The degree of positive or negative extrusion may be randomly sampled from a Gaussian distribution, for example with a 0.0 mean and a 0.07 standard deviation.

Figure 6D:
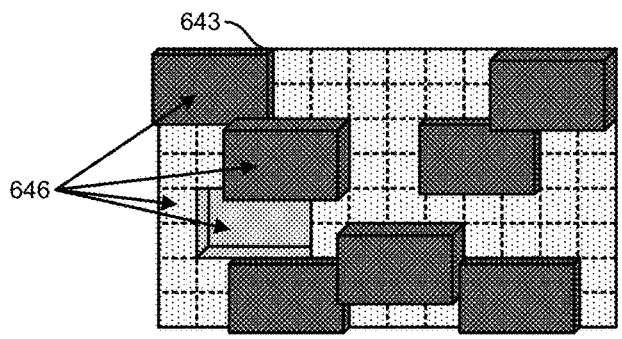
FIG. 6D illustrates a perspective view of an example embodiment of a distorted background plane that has added noise.

FIG. 6D illustrates a perspective view of an example embodiment of a distorted background plane 643 that has added noise. The synthetic-image-generation device 200 may add noise to the background plane, for example by adding noise to some or all of the vertices 644 on the surface of the background plane 643, thereby producing a grainy-looking textured surface 646. For example, the noise may be randomly sampled from a Gaussian distribution with a 0.0 mean and a 0.01 standard deviation.

Referring again to FIG. 2, in block B202 the synthetic-image-generation device 200 also adds a texture 222 (e.g., texture image) to the object model 221 and adds background images 224 to one or both of the support plane and the background plane. The texture 222 and the background images 224 may each provide a context that is compatible with the object model 221. The texture 222 that is applied to the object model 221 may be an image that depicts a material that can compose the object model 221 in the real-world. The background images 224 may depict images of materials that are found in the scene, images of entire scenes, and images of portions of scenes. Some embodiments of the synthetic-image-generation device 200 have a library of textures 222 and background image 224. Also, some embodiments of the synthetic-image-generation device 200 randomly assign an appropriate texture 222 to the object model and randomly assign an appropriate background image 224 to the background plane or the support plane.

The background image 224 may provide a context that is compatible with the object model 221 and the texture 222 that is applied to the object model 221. For example, if the object model 221 is a model of a chair or a table, then the texture 222 that is applied to the object model 221 may be an image of wood or metal. Appropriate background images 224 may be images of dining rooms, wallpaper, curtains, bookcases, painted walls, wood, carpet, tile, or linoleum. Also for example, if the object model 221 is a model of a bed or a nightstand, then the texture 222 that is applied to the object model 221 may be an image of wood, metal, or a textile pattern. Appropriate background images 224 may be images of bedrooms, carpet, or wood.

Figure 7:
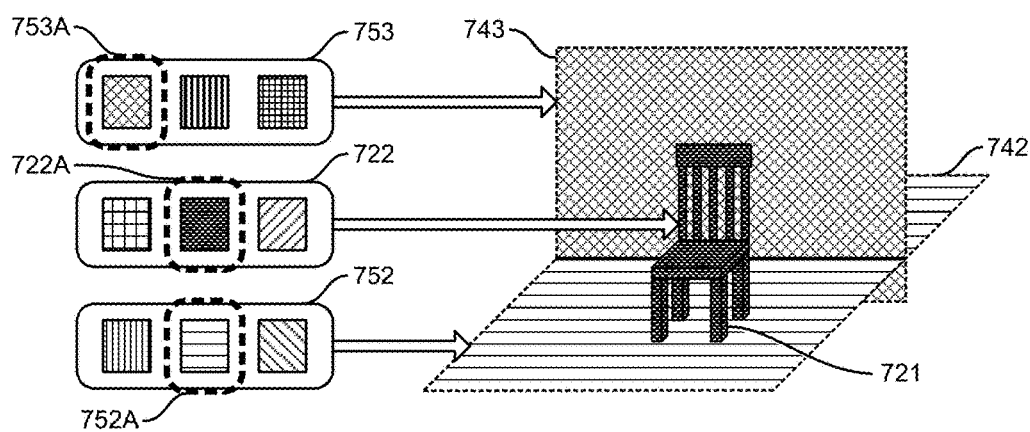
FIG. 7 illustrates example embodiments of candidate texture images for an object model, a support plane, and a background plane.

FIG. 7 illustrates example embodiments of candidate textures for an object model and candidate background images for a support plane and a background plane. This embodiment separates the background images for the background plane 743 from the background images from the support plane 742. In this example, the set of textures 722, the set of background images 753 for the background plane 743, and the set of background images 752 for the support plane 742 each includes three candidates. A selected texture 722A is applied to the object model 721, a selected background image 753A is applied to the background plane 743, and a selected background image 752A is applied to the support plane 742.

Referring again to FIG. 2, in block B203 the synthetic-image-generation device 200 determines the position of the simulated image sensor in the synthetic scene. The synthetic-image-generation device 200 may modify the image sensor's three-dimensional position so that the object model's projection on the image plane fits the image sensor's frame and so that the distances from the image sensor to the object model and to the background plane are within the image sensor's maximum depth range. To increase the variation of the generated image data, while generating multiple synthetic scenes, some embodiments of the synthetic-image-generation device 200 do not restrict the allowed distances to respective values, but randomly define the distances while adhering to certain criteria (e.g., the view from the image sensor to the object model remains unobstructed, the object model is within the sensor's maximum range).

For example, some embodiments of the synthetic-image-generation device 200 first adjust the simulated image sensor's location so that the object model's projection fits on the image plane. Given this new image-sensor location, some embodiments of the synthetic-image-generation device 200 shift the image sensor in such a way that (a) it introduces a variety and randomness in the composition of the synthetic 3D scene during the generation process, and (b) the distances of the object model and the background plane from the image sensor fall within the image sensor's maximum range. Some embodiments of the synthetic-image-generation device 200 achieve this as follows:

First, these embodiments define a range within which the distance from the image sensor to the background plane is range=[minDist maxDist]. These embodiments then divide this distance into three distances: (1) a distance from the background plane to the object model, (2) a distance from the object model to the current image sensor location, and (3) a distance from the current image-sensor location to the shifted image-sensor location. These embodiments then compute distance (2) using the position of the image sensor's tightest bounding box as a reference point. This distance remains unchanged in the remaining operations, and the goal of some of these embodiments is to define the other two distances (i.e., distances (1) and (3)) in a randomized way, subject to restrictions. Given the range, these embodiments randomly assign a value from a predefined range to the distance (1) from the object model to the background plane and another to the distance (3) from the current image-sensor location to the shifted image-sensor location, such that the sum of these two distances and the previously-computed distance from the image sensor to the object model falls within the range. These embodiments then update the current image-sensor and background-plane locations with the results. Because the results are in the format of a distance, whereas the locations are in coordinates, some embodiments use a triangle-proportionality theorem and the properties of parallel lines to compute the corresponding coordinates given the distances. In some embodiments, the operations can be described as follows:

range=[minDist, maxDist], where minDist<maxDist<the maximum range of depth sensor;

dPO=3D distance from the center of the background plane to the center of the object model's tightest bounding box (distance (1) above);

dOC=3D distance from the current image-sensor location to the center of the object model's tightest bounding box (distance (2) above);

dCC'=3D distance from the current image-sensor location to the shifted image-sensor location (distance (3) above);

C'=(C'x, C'y, C'z), the shifted position of the image sensor;

C=(Cx, Cy, Cz), the current position of the image sensor;

O=(Ox, Oy, Oz), the position of the center of the object model's tightest bounding box;

P=(Px, Py, Pz), the position of the center of the background plane;

while (dPO+dOC+dCC')>maxDist or (dPO+dOC+dCC')<minDist do:

dPO=random value in [0,5]+½*(maximum of the object model's widths), dCC'=random value in [0,3];

$C'x=(dCC'*(Cx-Ox)/dOC)+Cx;$ $C'y=(dCC'*(Cy-Oy)/dOC)+Cy;$ $C'z=(dCC'*(Cz-Oz)/dOC)+Cz;$ $C=C';$ $$Px=(dPO*(Ox-C'x)/dOC)+Ox;$$

$$Py=(dPO*(Oy-C'y)/dOC)+Oy;$$

$$Pz=(dPO*(Oz-C'z)/dOC)+Oz.$$

Figure 8A:
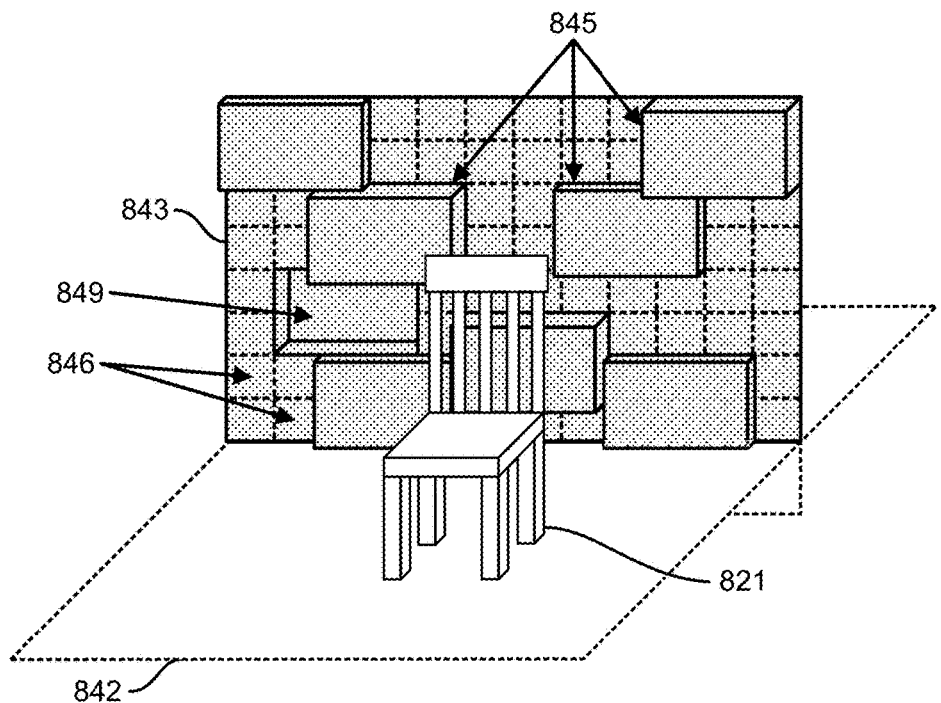
FIG. 8A illustrates a perspective view of an example embodiment of the depth components of a synthetic scene.
Figure 8B:
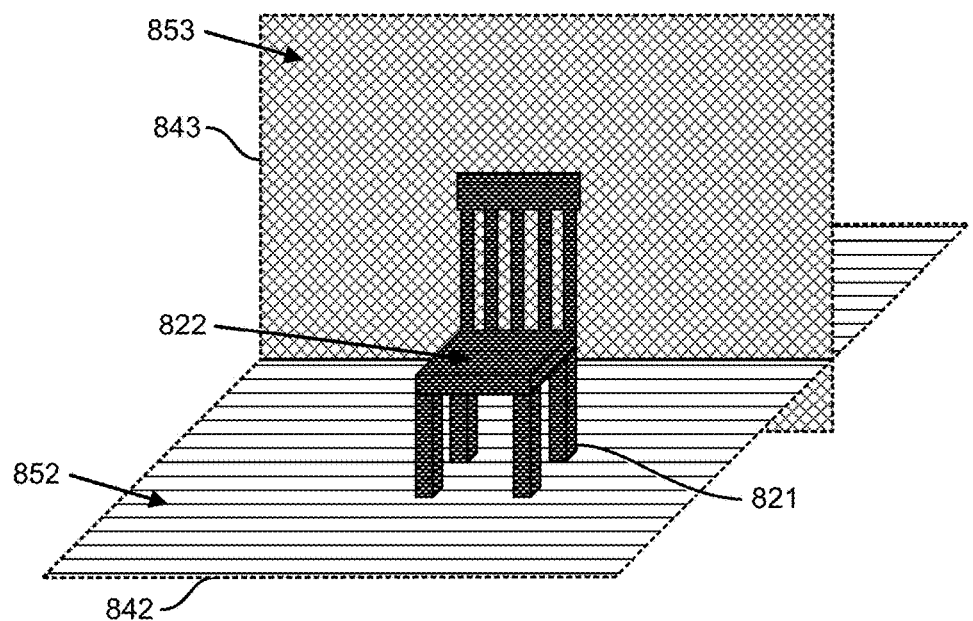
FIG. 8B illustrates a perspective view of an example embodiment of the illumination-map components of the synthetic scene.

FIG. 8A illustrates a perspective view of an example embodiment of the depth components of a synthetic scene, and FIG. 8B illustrates a perspective view of an example embodiment of the illumination-map components (e.g., RGB components) of the synthetic scene. The depth components in FIG. 8A include the object model 821, the support plane 842, and the background plane 843. The background plane 843 includes extrusions 845, an intrusion 849, and noise 846. The illumination-map components in FIG. 8B include the texture 822 of the object model 821, the background image 852 that has been applied to the support plane 842, and the background image 853 that has been applied to the background plane 843.

Finally, referring again to FIG. 2, in block B204 the synthetic-image-generation device 200 generates one or more multi-modal-image pairs 230 based on the synthetic scene. Each multi-modal-image pair 230 includes a light-intensity image (e.g., an RGB image) and a depth image. The synthetic-image-generation device 200 may send the multi-modal-image pair 230 to a storage device 210 or store the multi-modal-image pair 230 locally.

For example, to generate a synthetic RGB image of a multi-modal-image pair, the synthetic-image-generation device 200 may first define the image sensor as an RGB sensor and then render the image given the synthetic scene. The synthetic-image-generation device 200 may also apply a Gaussian filter to the image, apply Gaussian noise to the pixels, or apply other types of noise. Also for example, to generate a synthetic depth image, the synthetic-image-generation device 200 may first define the simulated image sensor as a depth sensor and then render the depth image given the synthetic scene. If the output of the depth sensor is a point cloud, then the synthetic-image-generation device 200 may convert the point cloud to a depth image by calculating the three-dimensional distance from the image-sensor location (e.g., a pixel) to each point in the point cloud and creating a two-dimensional matrix of these distances. This matrix can have the same dimensions as the defined image size.

When some embodiments of the synthetic-image-generate device 200 generate more than one multi-modal-image pair 230, they introduce small variations at random to one or more of the size of the object model, the sensor's position, the location or orientation of the support plane, and the location or orientation of the background plane, while ensuring that the distance from any scene element to the simulated image sensor falls within the image sensor's maximum range.

Figure 9:
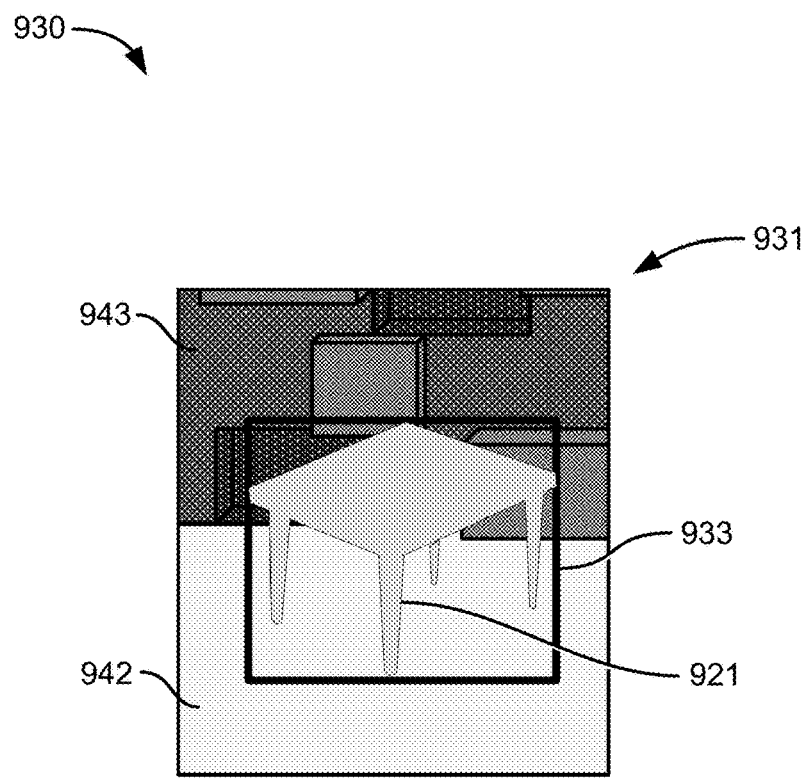
FIG. 9 illustrates the two images in an example embodiment of a multi-modal-image pair.
Figure 9:
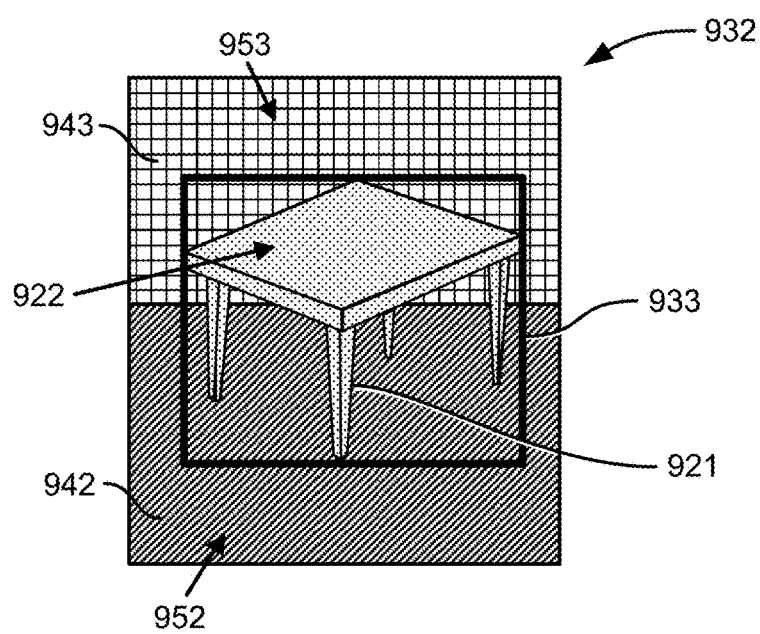

FIG. 9 illustrates the two images in an example embodiment of a multi-modal-image pair. The multi-modal-image pair 930 includes a depth image 931 and an illumination-map image 932 (e.g., an RGB image). Both the depth image 931 and the illumination-map image 932 show an object model 921, a support plane 942, and a background plane 943. The background plane 943 has been deformed. Also, the illumination-map image 932 shows the texture 922 that has been applied to the object model 921, the background image 952 that has been added to the support plane 942, and the background image 953 that has been added to the background plane 943. Additionally, both the depth image 931 and the illumination-map image 932 include an annotation 933 of the object model 921. In this example embodiment, the annotation 933 is a bounding box.

Figure 10:
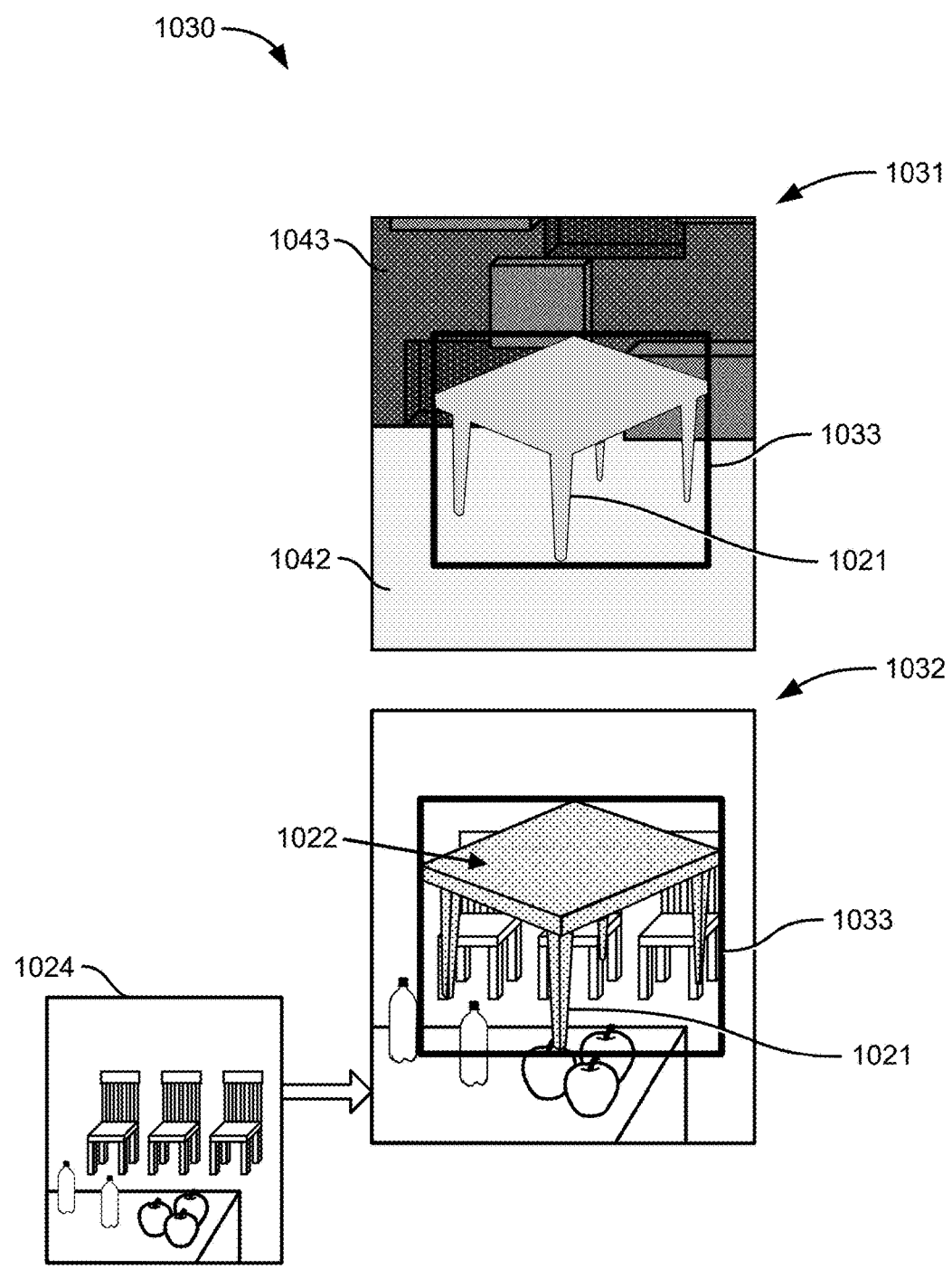
FIG. 10 illustrates the two images in an example embodiment of a multi-modal-image pair.

FIG. 10 illustrates the two images in an example embodiment of a multi-modal-image pair. The multi-modal-image pair 1030 includes a depth image 1031 and an illumination-map image 1032 (e.g., an RGB image). Both the depth image 1031 and the illumination-map image 1032 show an object model 1021. The background plane 1043 in the depth image 1031 has been deformed. The illumination-map image 1032 shows the texture 1022 that has been applied to the object model 1021 and shows a background image 1024 that has been applied to both the background plane 1043 and the support plane 1042. Additionally, both the depth image 1031 and the illumination-map image 1032 include an annotation 1033 of the object model 1021.

Figure 11:
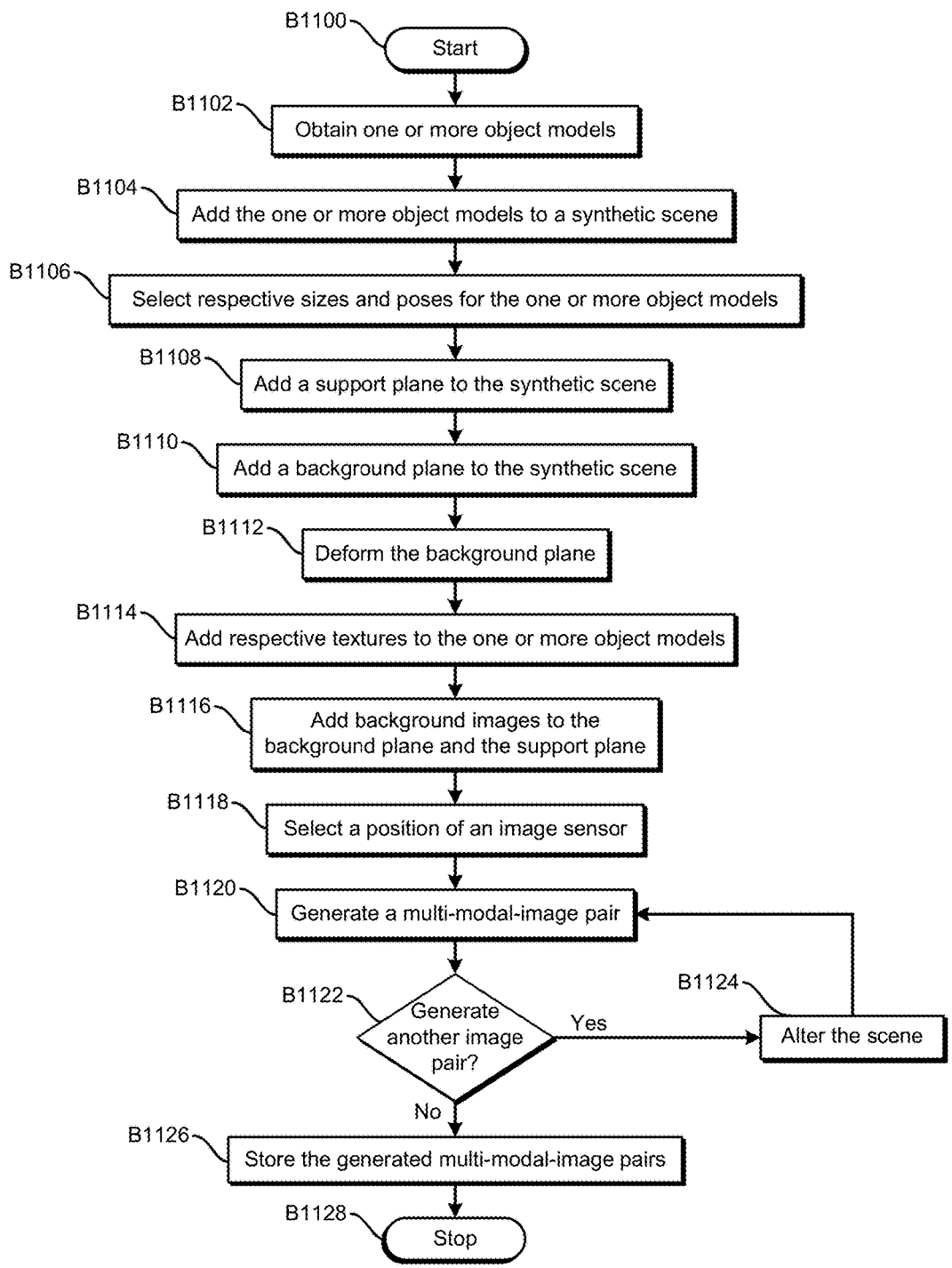
FIG. 11 illustrates an example embodiment of an operational flow for generating synthetic images.

FIG. 11 illustrates an example embodiment of an operational flow for generating synthetic images. Although this operational flow and the other operational flows that are described herein are each presented in a certain order, some embodiments of these operational flows perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although this operational flow and the other operational flows that are described herein are described as being performed by a synthetic-image-generation device, other embodiments of these operational flows may be performed by two or more synthetic-image-generation devices or by one or more other specially-configured computing devices.

The flow starts in block B1100 and then moves to block B1102, where a synthetic-image-generation device obtains one or more object models. Next, in block B1104, the synthetic-image-generation device adds the one or more object models to a synthetic scene. The flow then moves to block B1106, where synthetic-image-generation device selects respective sizes and poses for the one or more object models. Next, in block B1108, the synthetic-image-generation device adds a support plane to the synthetic scene, and in block B1110 the synthetic-image-generation device adds a background plane to the synthetic scene. The flow then proceeds to block B1112, where the synthetic-image-generation device deforms the background plane, for example by adding noise, extrusions, or intrusions to the background plane. The synthetic-image-generation device may also warp or otherwise distort the background plane.

Then, in block B1114, the synthetic-image-generation device adds respective textures to the one or more object models. Next, in block B1116, the synthetic-image-generation device applies one or more respective background images to the background plane and the support plane. In some embodiments, a single background image is applied to both the background plane and the support plane.

The flow then moves to block B1118, where the synthetic-image-generation device selects a position of an image sensor. Next, in block B1120, the synthetic-image-generation device generates a multi-modal-image pair based on the synthetic scene. Also, the synthetic-image-generation device may add noise to the illumination-map image or the depth image. Furthermore, the synthetic-image-generation device may annotate the multi-modal-image pair, for example with respective bounding boxes around the one or more object models.

The flow then moves to block B1122, where the synthetic-image-generation device determines if another multi-modal-image pair is to be generated. If yes (block B1122=Yes), then the flow proceeds to block B1124. In block B1124, the synthetic-image-generation device alters the scene. For example, the synthetic-image-generation device may change the size of an object model, the pose of an object model, the position of the image sensor, one or more textures, one or more background images, or the deformation of the background plane. As they repeatedly perform the operations in block B1124, some embodiments of the synthetic-image-generation device rotate an object model incrementally around the x, y, and z axes in rotation angles that range from −10° to 10° or the x axis, from 0° to 20° on the y axis, and from 70° to 100° on the z axis. Also, the texture images or the background images may be randomly selected from the appropriate collection of texture images or background images. Thus, in some embodiments, the operations of block B1124 include at least some of the operations in one or more of blocks B1106 and B1112-B1118. After block B1124, the flow returns to block B1120.

However, if the synthetic-image-generation device determines that another multi-modal-image pair is not to be generated (block B1122=No), then the flow moves to block B1126. In block B1126, the synthetic-image-generation device stores the generated multi-modal-image pairs, and then the flow ends in block B1128.

Figure 12:
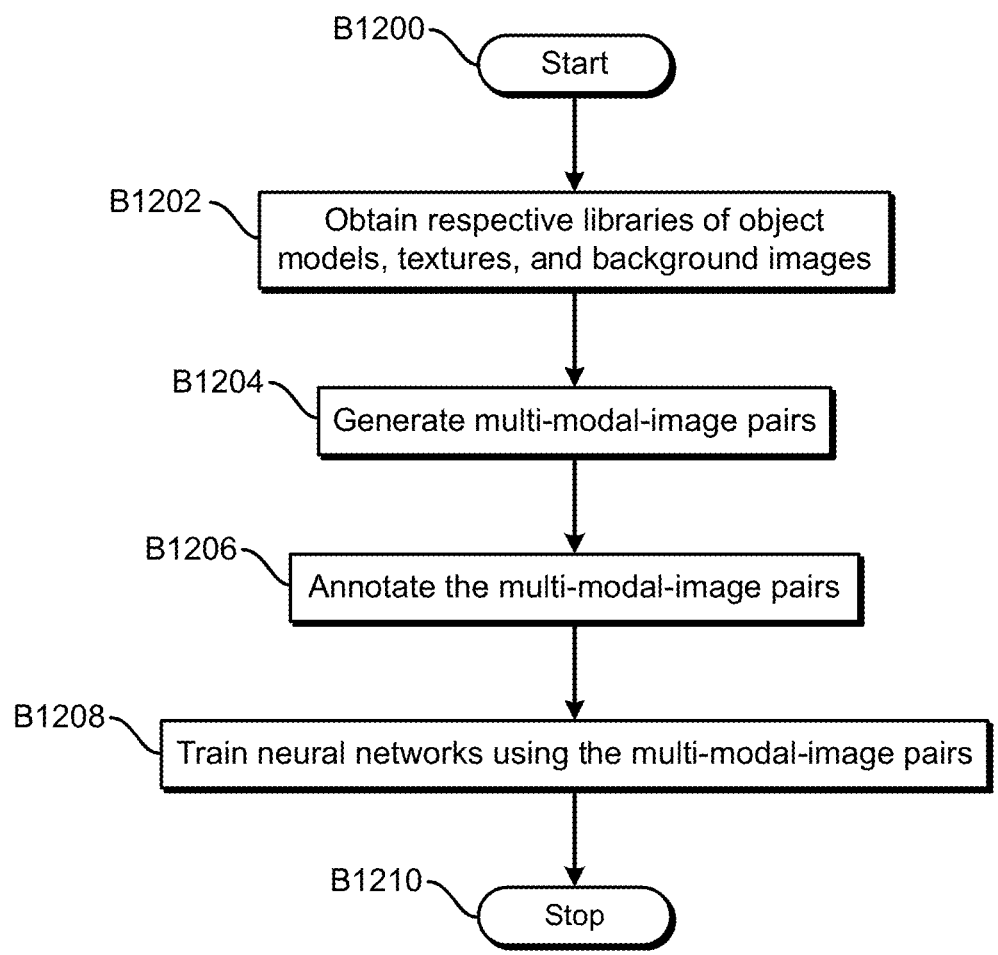
FIG. 12 illustrates an example embodiment of an operational flow for deep learning.

FIG. 12 illustrates an example embodiment of an operational flow for deep learning. The flow starts in block B1200 and then proceeds to block B1202, where the synthetic-image-generation device obtains respective libraries of object models, textures, and background images. Next, in block B1204, the synthetic-image-generation device generates multi-modal-image pairs, for example as described in FIG. 11. The flow then moves to block B1206, where the synthetic-image-generation device annotates the multi-modal-image pairs. Then in block B1208, the synthetic-image-generation device trains one or more neural networks using the annotated multi-modal-image pairs. Finally, the flow ends in block B1210.

Figure 13:
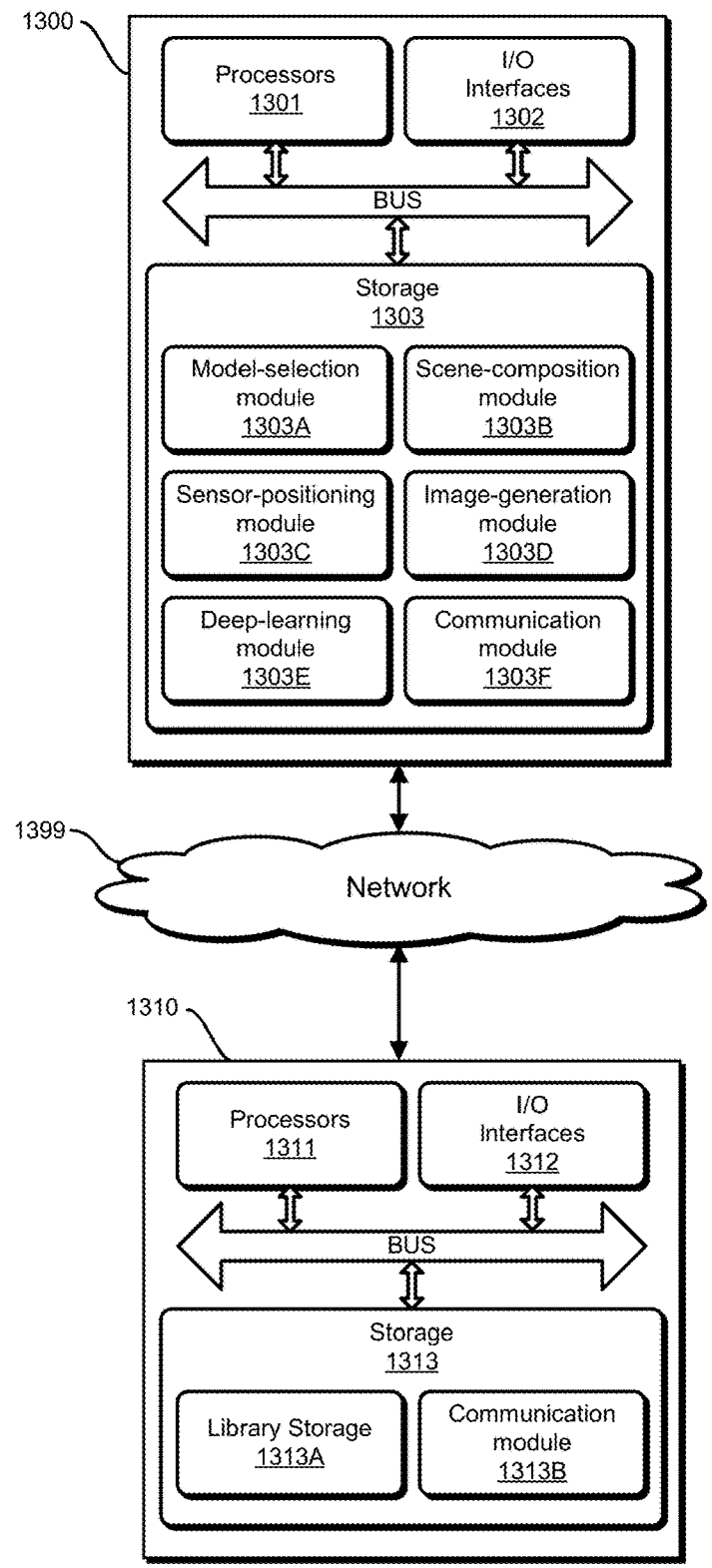
FIG. 13 illustrates an example embodiment of a system for generating synthetic images.

FIG. 13 illustrates an example embodiment of a system for generating synthetic images. The system includes a synthetic-image-generation device 1300, which is a specially-configured computing device; and a library-storage device 1310. In this embodiment, the devices communicate by means of one or more networks 1399, which may include a wired network, a wireless network, a LAN, a WAN, a MAN, and a PAN. Also, in some embodiments the devices communicate by means of other wired or wireless channels.

The synthetic-image-generation device 1300 includes one or more processors 1301, one or more I/O interfaces 1302, and storage 1303. Also, the hardware components of the synthetic-image-generation device 1300 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1301 include one or more central processing units (CPUs), which include microprocessors (e.g., a single core microprocessor, a multi-core microprocessor); graphics processing units (GPUs); or other electronic circuitry. The one or more processors 1301 are configured to read and perform computer-executable instructions, such as instructions that are stored in the storage 1303. The I/O interfaces 1302 include communication interfaces for input and output devices, which may include a keyboard, a display device, a mouse, a printing device, a touch screen, a light pen, an optical-storage device, a scanner, a microphone, a drive, a controller (e.g., a joystick, a control pad), and a network interface controller.

The storage 1303 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1303, which may include both ROM and RAM, can store computer-readable data or computer-executable instructions.

The synthetic-image-generation device 1300 also includes a model-selection module 1303A, a scene-composition module 1303B, a sensor-positioning module 1303C, an image-generation module 1303D, a deep-learning module 1303E, and a communication module 1303F. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 1303.

The model-selection module 1303A includes instructions that, when executed, or circuits that, when activated, cause the synthetic-image-generation device 1300 to obtain one or more object models (such as object models in a particular category), for example from the library-storage device 1310; select one or more object models for inclusion in a synthetic scene; or receive a selection that indicates one or more object models. In some embodiments, these operations include at least some of the operations that are performed in block B201 in FIG. 2 or block B1102 in FIG. 11.

The scene-composition module 1303B includes instructions that, when executed, or circuits that, when activated, cause the synthetic-image-generation device 1300 to select a size for an object model, select a pose of the object model, add a support plane to a scene, add a background plane to a scene, deform the background plane, add a texture to an object model, add a background image to a support plane, or add a background image to a background plane. In some embodiments, these operations include at least some of the operations that are performed in block B202 in FIG. 2 or blocks B1104-B1116 in FIG. 11.

The sensor-positioning module 1303C includes instructions that, when executed, or circuits that, when activated, cause the synthetic-image-generation device 1300 to determine the position of an image sensor in the synthetic scene. In some embodiments, these operations include at least some of the operations that are performed in block B203 in FIG. 2 or block B1118 in FIG. 11.

The image-generation module 1303D includes instructions that, when executed, or circuits that, when activated, cause the synthetic-image-generation device 1300 to generate multi-modal-image pairs based on a synthetic scene or to annotate a multi-modal-image pair. In some embodiments, these operations include at least some of the operations that are performed in block B204 in FIG. 2 or blocks B1120-B1124 in FIG. 11. Also, the image-generation module 1303D may call one or more of the model-selection module 1303A, the scene-composition module 1303B, and the sensor-positioning module 1303C.

The deep-learning module 1303E includes instructions that, when executed, or circuits that, when activated, cause the synthetic-image-generation device 1300 to train or more neural networks using multi-modal-image pairs of a synthetic scene. In some embodiments, these operations include at least some of the operations that are performed in block B1208 in FIG. 12.

The communication module 1303F includes instructions that, when executed, or circuits that, when activated, cause the synthetic-image-generation device 1300 to communicate with one or more other devices, for example the library-storage device 1310.

The library-storage device 1310 includes one or more processors 1311, one or more I/O interfaces 1312, storage 1313, library storage 1313A, and a communication module 1313B. The library storage 1313A stores scene components (e.g., object models, textures, background images, light-source information, capturing-system information). The communication module 1313B includes instructions that, when executed, or circuits that, when activated, cause the library-storage device 1310 to communicate with the synthetic-image-generation device 1300.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A system comprising:
   one or more non-transitory computer-readable media; and
   one or more processors that are coupled to the one or more computer-readable media and that are configured to cause the system to
   obtain an object model;
   add the object model to a synthetic scene;
   add a texture to the object model;
   add a background plane to the synthetic scene;
   add a support plane to the synthetic scene;
   add a background image to one or both of the background plane and the support plane; and
   generate a pair of images based on the synthetic scene, wherein a first image in the pair of images is a depth image of the synthetic scene, and wherein a second image in the pair of images is a color image of the synthetic scene.

2. The system of claim 1, wherein the one or more processors are further configured to cause the system to
   select a position of a simulated image sensor, wherein the first image and the second image are generated from a perspective of the simulated image sensor.

3. The system of claim 2, wherein the one or more processors are further configured to cause the system to
   select, at random, a pose of the object model relative to the simulated image sensor.

4. The system of claim 1, wherein the one or more processors are further configured to cause the system to deform the background plane.

5. The system of claim 4, wherein, to deform the background plane, the one or more processors are further configured to cause the system to
   add extrusions to the background plane,
   add intrusions to the background plane, or
   add noise to the background plane.

6. The system of claim 1, wherein the one or more processors are further configured to cause the system to
   test different sizes of the object model for compatibility with a scale of the synthetic scene;
   select one of the different sizes of the object model; and
   set a size of the object model to the selected one of the different sizes.

7. The system of claim 1, wherein the one or more processors are further configured to cause the system to
   generate an altered synthetic scene by performing one or more of the following:
      adding a different texture to the object model,
      adding a different background image to one or both of the background plane and the support plane,
      changing a size of the object model,
      changing a position of a simulated image sensor, and
      changing a pose of the object model; and
   generate a second pair of images based on the altered synthetic scene, wherein a first image in the second pair of images is a depth image of the altered synthetic scene, and wherein a second image in the second pair of images is a color image of the altered synthetic scene.

8. One or more non-transitory computer-readable storage media storing computer-executable instructions that, when executed by one or more computing devices, cause the one or more computing devices to perform operations comprising:
   adding an object model to a synthetic scene;
   adding a texture to the object model;
   adding a background plane to the synthetic scene;
   adding a background image to the background plane; and
   generating a pair of images based on the synthetic scene, wherein a first image in the pair of images is a depth image of the synthetic scene, and wherein a second image in the pair of images is an illumination-map image of the synthetic scene.

9. The one or more computer-readable storage media of claim 8, wherein the operations further comprise:
   adding a support plane to the synthetic scene.

10. The one or more computer-readable storage media of claim 9, wherein the support plane is added to the synthetic scene below the object model.

11. The one or more computer-readable storage media of claim 9, wherein the support plane is added to the synthetic scene above the object model.

12. The one or more computer-readable storage media of claim 8, wherein the object model is a computer-aided-design (CAD) model.

13. The one or more computer-readable storage media of claim 8, wherein the operations further comprise
  determining a position of a simulated image sensor in the synthetic scene, wherein the pair of images is generated from the perspective of the simulated image sensor.

14. The one or more computer-readable storage media of claim 13, wherein the operations further comprise:
  positioning the object model and the background plane in the synthetic scene such that both the object model and the background plane are within a depth range of the simulated image sensor.

15. A method comprising:
  selecting an object model from a first object category;
  adding the object model to a synthetic scene;
  selecting a texture from a first texture category, wherein the first texture category corresponds to the first object category;
  adding the texture to the object model;
  adding a background plane to the synthetic scene;
  selecting a background image from a first background-image category, wherein the first background-image category corresponds to the first object category;
  adding the background image to the background plane; and
  generating a pair of images based on the synthetic scene, wherein a first image in the pair of images is a depth image of the synthetic scene, and wherein a second image in the pair of images is an illumination-map image of the synthetic scene.

16. The method of claim 15, wherein the texture is an image of wood, metal, ceramic, or textile.

17. The method of claim 15, wherein the first object category is furniture, wherein the first texture category is materials that compose furniture, and wherein the first background-image category is scenes that include furniture.

18. The method of claim 15, further comprising:
  adding a support plane to the synthetic scene.

19. The method of claim 18, further comprising:
  adding the background image to the support plane.

20. The method of claim 18, further comprising:
  adding a second background image to the support plane, wherein the second background image is different from the background image.

* * * * *